United States Patent [19]

Coetsier

[11] 4,455,759

[45] Jun. 26, 1984

[54] APPARATUS FOR MEASURING THE ALIGNMENT OF THE FRONT AND REAR WHEEL SYSTEMS OF AUTOMOTIVE VEHICLES AS WELL AS THE SETBACK ANGLES BETWEEN THE WHEELS OF THE FRONT SYSTEM AND THE SIDE-SLIP ANGLE

[75] Inventor: Paul A. Coetsier, Lagny, France

[73] Assignee: Etablissements M. Muller et Cie, Paris, France

[21] Appl. No.: 340,694

[22] Filed: Jan. 19, 1982

[30] Foreign Application Priority Data

Jan. 20, 1981 [FR] France ................................ 81 00944

[51] Int. Cl.³ .............................................. G01B 11/26
[52] U.S. Cl. ................. 33/288; 33/180 AT; 33/203.14
[58] Field of Search ................. 33/288, 336, 337, 335, 33/180 AT, 181 AT, 203, 203.12, 203.15, 203.14, 203.16, 203.18, 203.19; 356/152, 156, 155

[56] References Cited

U.S. PATENT DOCUMENTS

| | | | |
|---|---|---|---|
| 4,095,902 | 6/1978 | Florer et al. | 356/155 |
| 4,106,208 | 8/1978 | Hunter | 33/288 |
| 4,130,362 | 12/1978 | Lilli et al. | 33/288 |
| 4,311,386 | 1/1982 | Coetsier | 33/288 |
| 4,319,838 | 3/1982 | Grossman et al. | 33/288 |

*Primary Examiner*—Willis Little
*Attorney, Agent, or Firm*—Young & Thompson

[57] ABSTRACT

The alignment of the front and rear wheel systems of automotive vehicles as well as the dynamic setback and static setback are measured by means of an angular displacement pickup supported by a horizontal arm at the level of each front wheel and connected by a reference straight line to the opposite pickup. A light beam produced by an emitter carried by each arm is reflected from a mirror carried by the rear wheel and impinges on a photosensitive cell. Wheel alignment and setback angles are obtained from the angle values determined by the pickups and corresponding to direction-changing movements of the front wheel system which is turned successively from left to right and from right to left.

2 Claims, 8 Drawing Figures

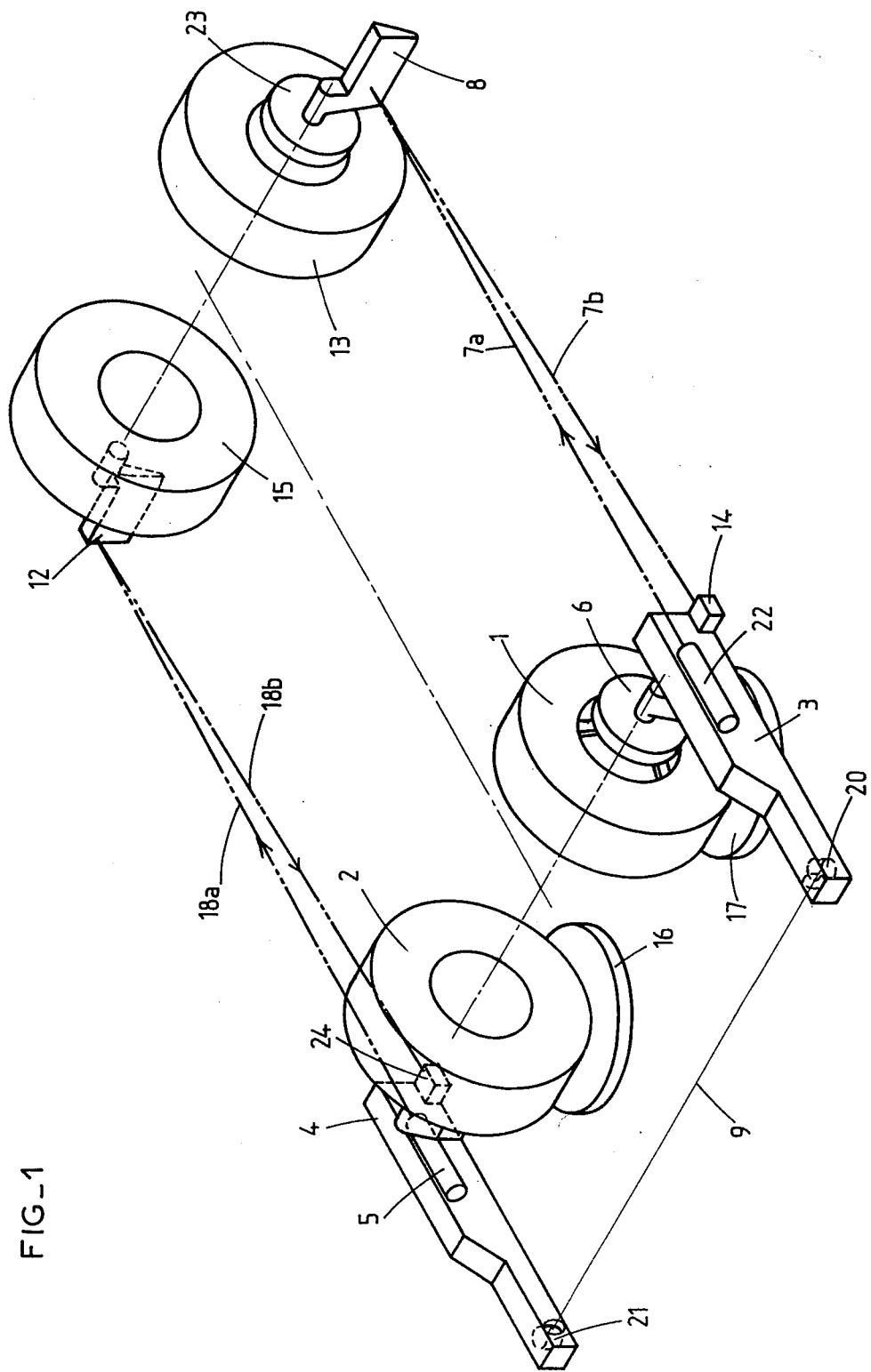
FIG_1

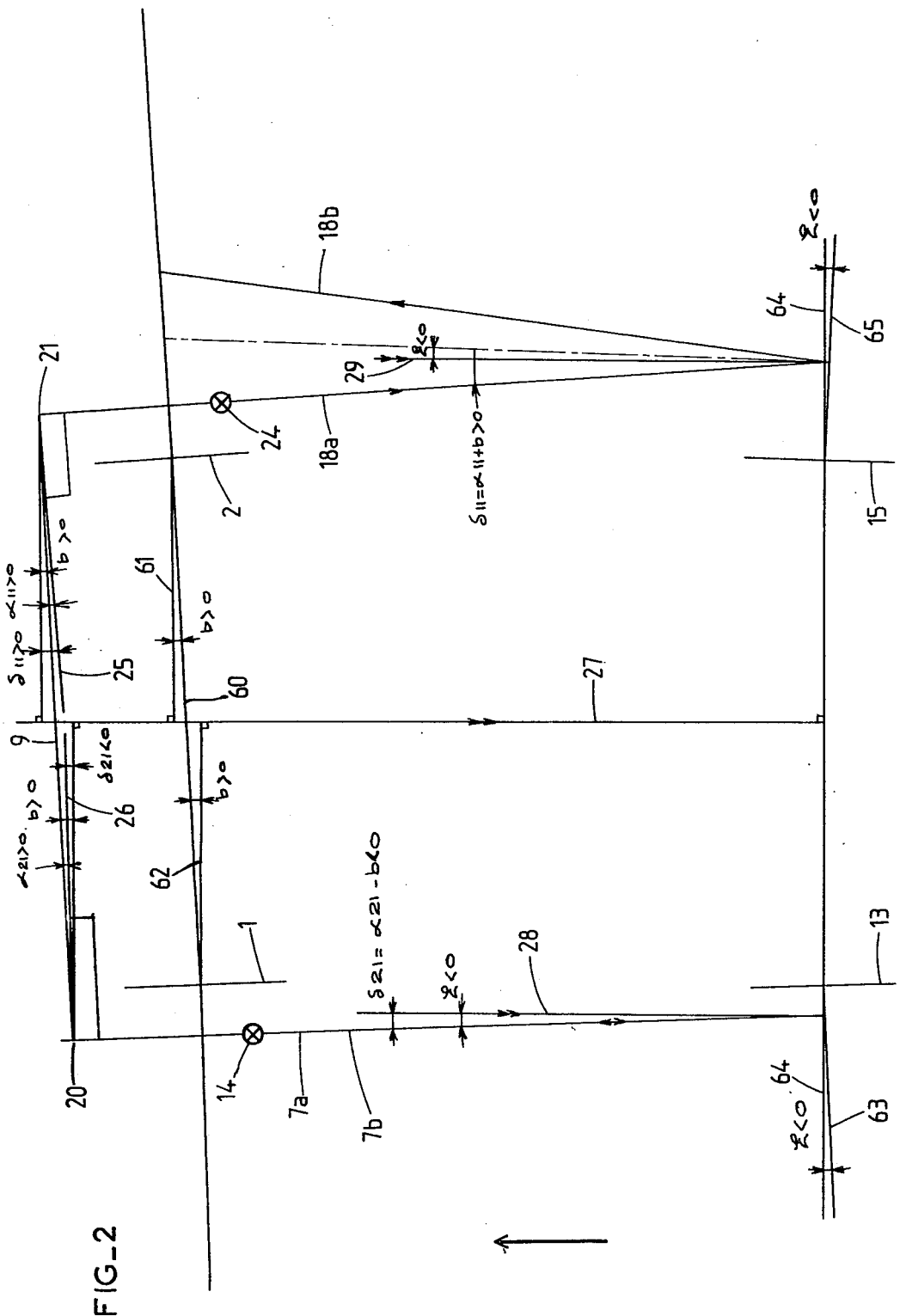

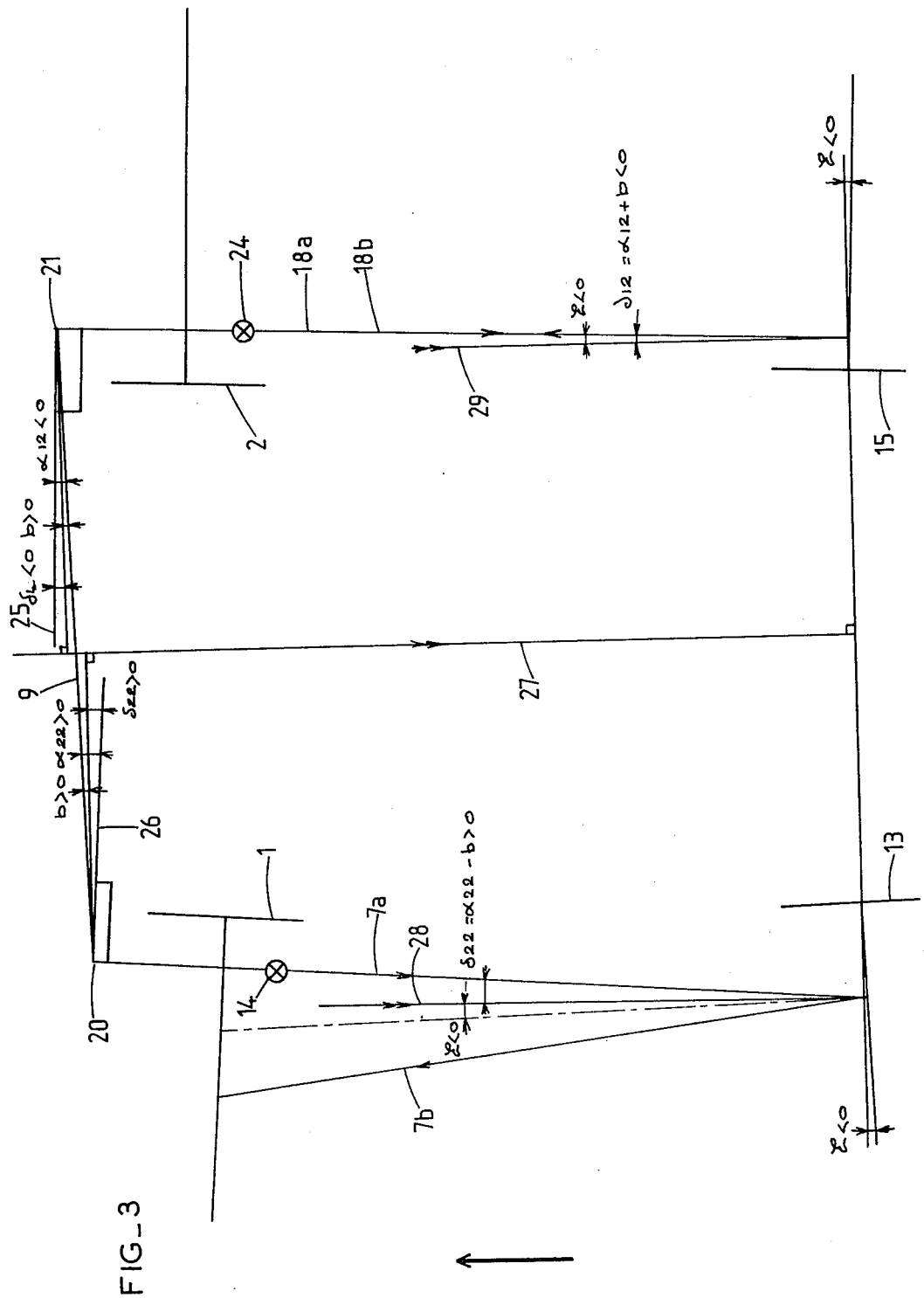

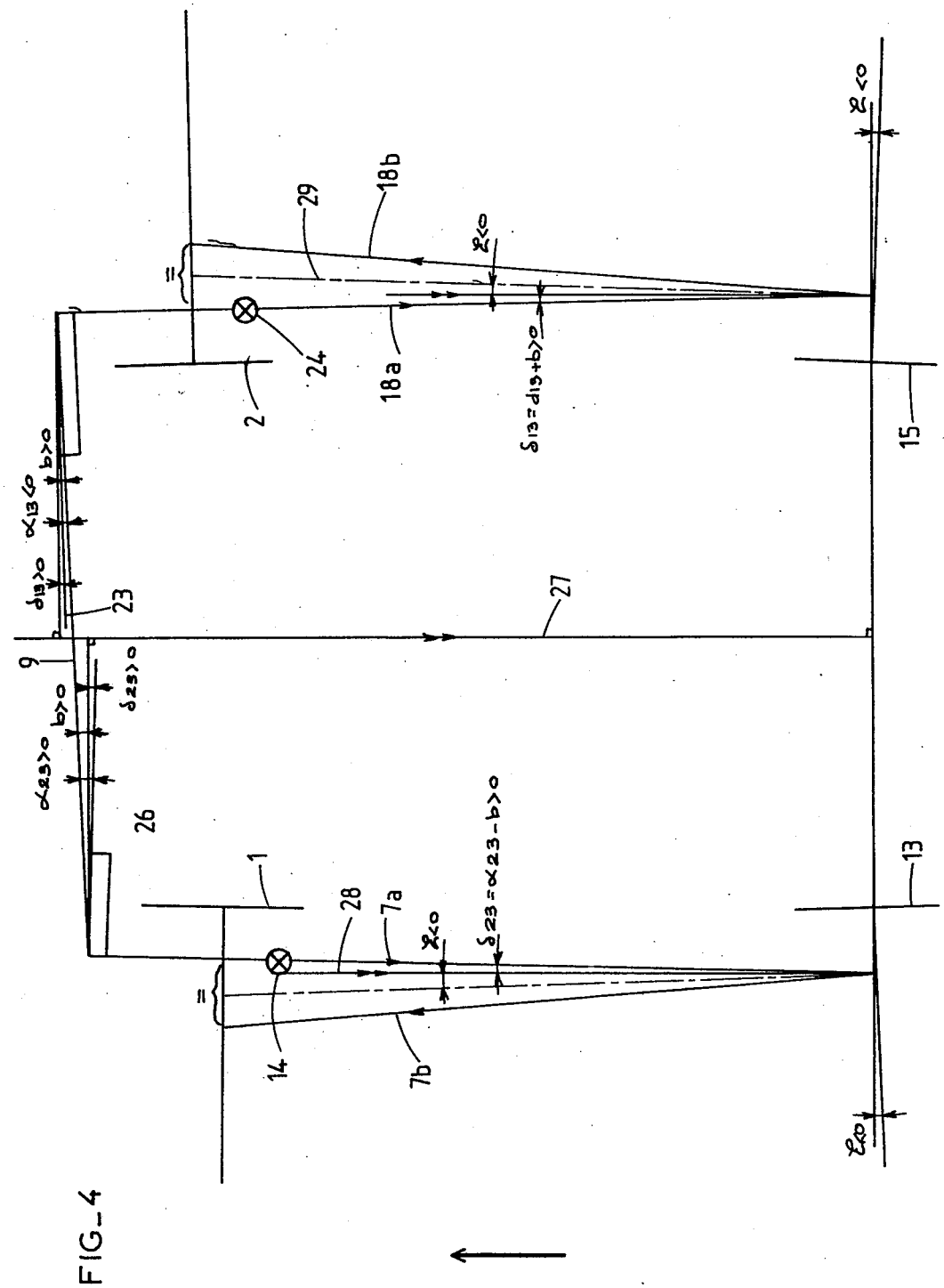

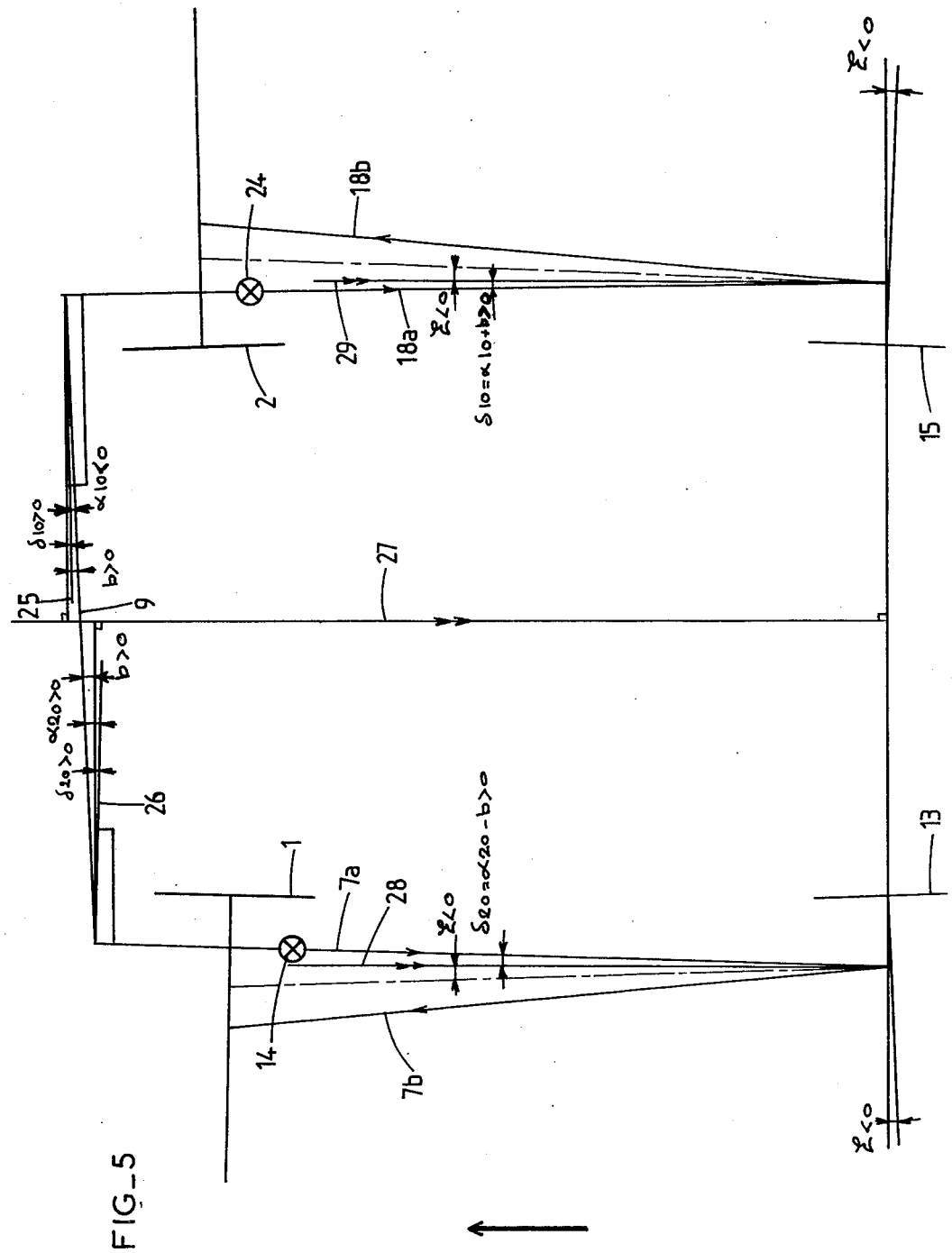

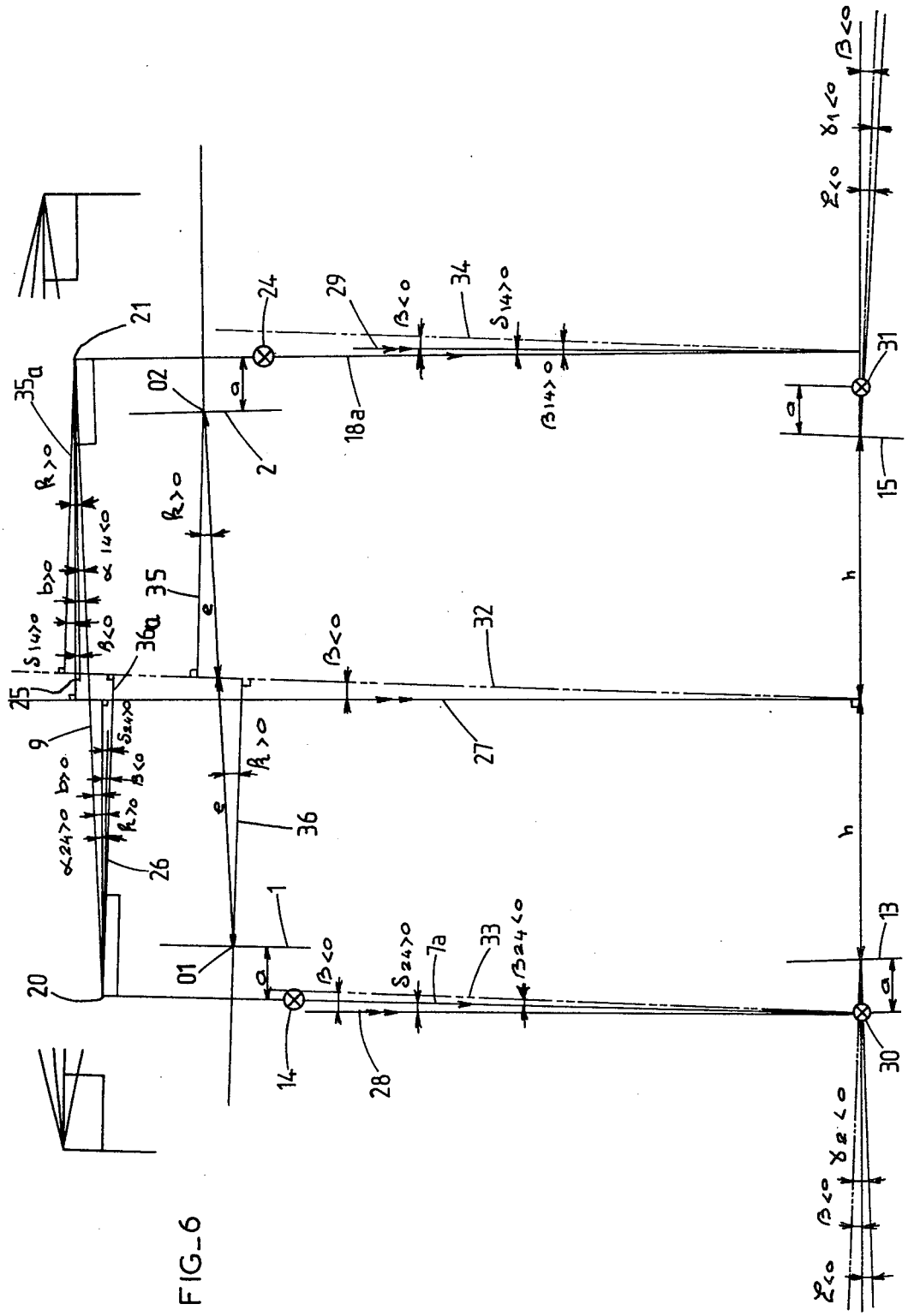
FIG_6

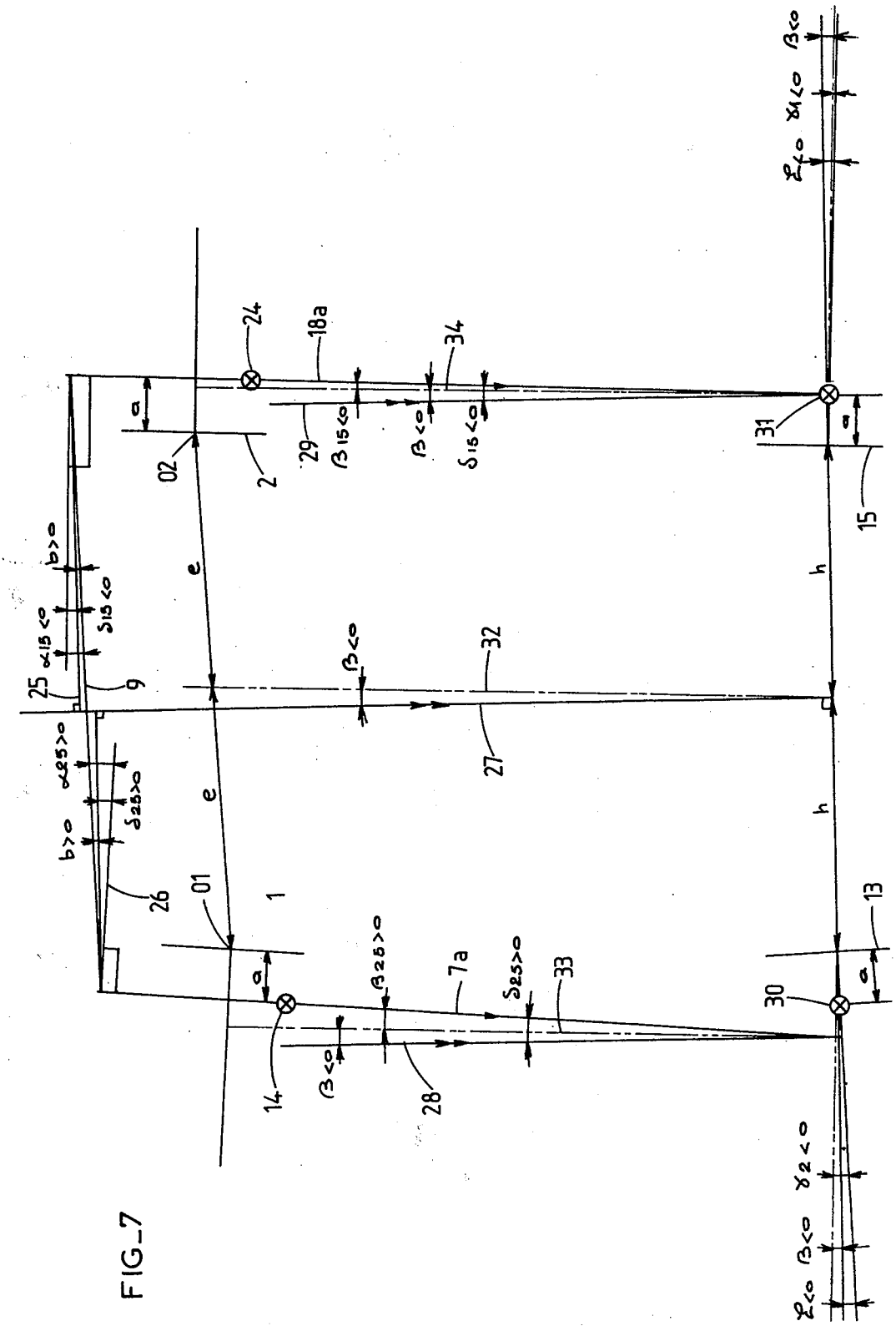

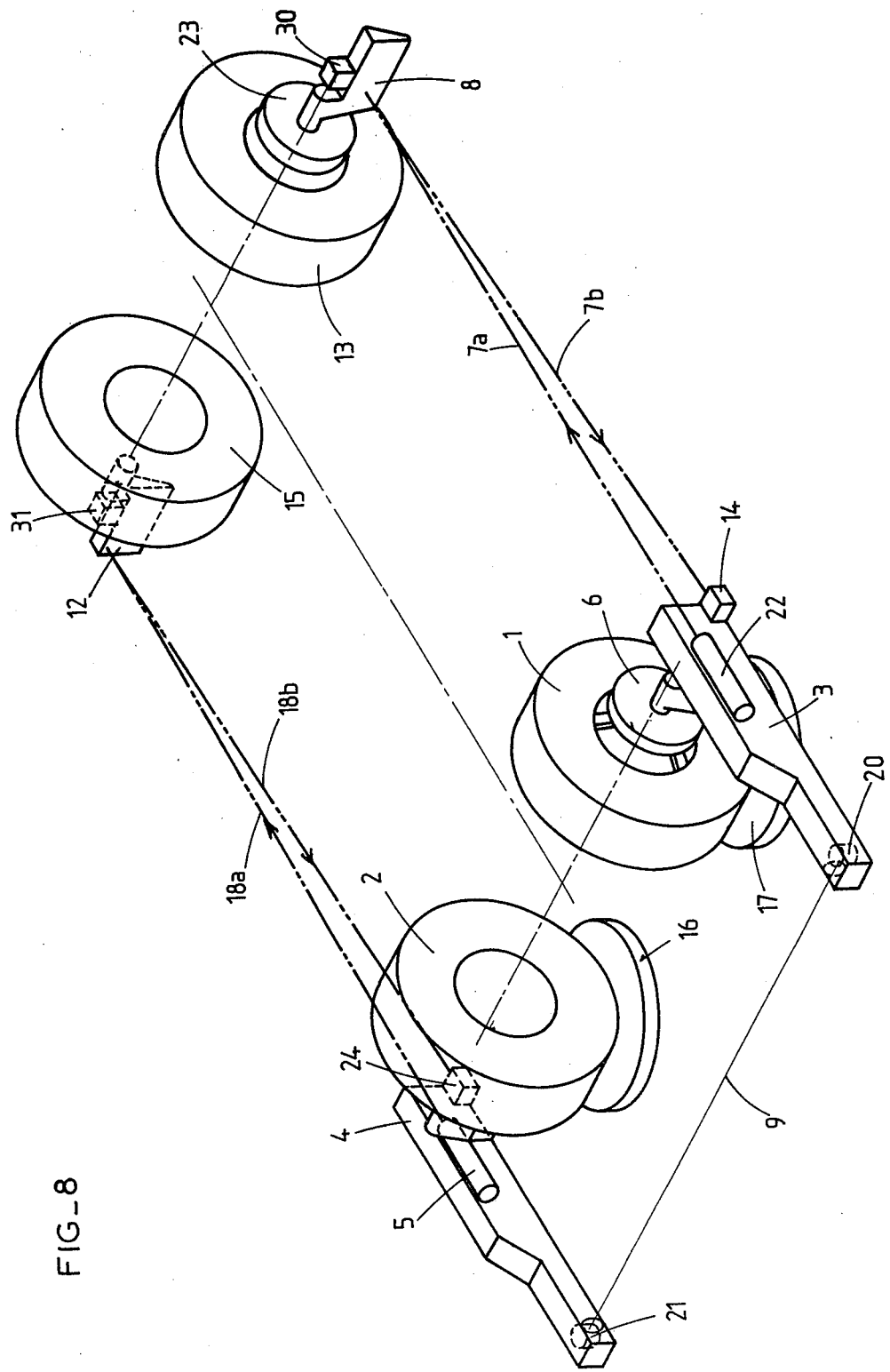
FIG_8

APPARATUS FOR MEASURING THE ALIGNMENT OF THE FRONT AND REAR WHEEL SYSTEMS OF AUTOMOTIVE VEHICLES AS WELL AS THE SETBACK ANGLES BETWEEN THE WHEELS OF THE FRONT SYSTEM AND THE SIDE-SLIP ANGLE

This invention relates to apparatus for measuring the parallel alignment of the front and rear wheel systems of automotive vehicles, the "setback" angles between the wheels of the front-wheel system, the side-slip angle of the vehicle, as well as other angular parameters which are useful for inspection and testing of a vehicle.

Different apparatus for checking the toe-in and toe-out angles of the front and rear wheels of a vehicle are already known. In a typical appliance, projectors placed in front of the vehicle serve to direct light beams transversely with respect to the vehicle in front of the front wheels as well as longitudinal beams which are parallel to the front wheels of the vehicle and are reflected from mirrors placed at the level of the rear wheels.

Appliances of this type fail to achieve the requisite degree of accuracy in the measurement of angles and may prove difficult to read in some instances, especially if they are exposed to direct sunlight. Furthermore, in order to carry out these known methods, it is first necessary to align the front wheels with the rear wheels by turning the steering-wheel of the vehicle until the two lines bisecting the angles delimited by the front and rear wheels are caused to coincide by means of a suitable lighting system.

It has also been proposed to employ laser emitters instead of the conventional light-beam emitters, the laser beams obtained being received on targets constituted by arrays of diodes. This method has proved particularly advantageous but results in relatively high cost of the corresponding equipment.

The aim of the invention is to provide apparatus which is not subject to the disadvantages of known apparatus and therefore make it possible at moderate cost to perform both fast and accurate measurement of a series of angular measurements relating to the front and rear wheel systems as well as other parameters of a vehicle.

According to the invention, apparatus for measuring the alignment of the front and rear wheel systems of automotive vehicles as a function of the axis of thrust of the vehicle, as well as the dynamic "setback" angle between the wheels of the front system, essentially consists in, at the level of each front wheel, a substantially horizontal arm supported by the corresponding wheel, means on each arm for defining a straight line which connects two fixed points located on the arms, and a light-beam emitter on each arm. The light beam produced by said emitter is parallel to the plane of the corresponding front wheel and directed towards the rear wheel which is located on the same side and is adapted to carry a mirror for reflecting the corresponding light beam onto a photosensitive cell mounted on the arm which is carried by the front wheel. The steering system of the vehicle is then centered with respect to the center-point of the vehicle as indicated by the manufacturer. The angle between the aforesaid reference straight line and the line which is perpendicular to the arm associated with the wheel and which is drawn from the corresponding fixed point is measured successively in the case of each front wheel in a first position of the front wheel system such that the left-hand front light beam impinges on the left-hand front cell whilst the right-hand front light beam is reflected beyond the corresponding cell as a result of a suitable angular displacement of the right-hand front wheel in order to measure the wheel alignment angle in the case respectively of the right-hand front wheel and the left-hand front wheel, then in a second position of the front wheel system which is reverse to the preceding and in which the right-hand front light beam is reflected from the corresponding cell whilst the left-hand front light beam impinges on a point located beyond the cell of the left-hand front wheel after a suitable pivotal displacement of this latter in order to measure the wheel alignment in the case respectively of the right-hand front wheel and the left-hand front wheel. The following values are determined geometrically from the four angles thus measured and computed successively:

$\delta_{10}$ = right-hand front wheel alignment angle as a function of the thrust axis when the steering system is at its mechanical center-point.

$\delta_{20}$ = left-hand front wheel alignment angle as a function of the thrust axis when the steering system is at its mechanical center-point.

$\delta_{13}$ = right-hand front wheel alignment angle when the front wheel alignment is equally distributed with respect to the thrust axis, that is, the dynamic alignment angle of the right-hand front wheel with respect to the thrust axis.

$\delta_{23}$ = left-hand front wheel alignment angle when the front wheel alignment is equally distributed with respect to the thrust axis, that is, the dynamic alignment angle of the left-hand front wheel with respect to the thrust axis.

b = dynamic setback angle.

$\xi$ = alignment angle of the rear wheel system.

The thrust axis of a vehicle being defined as the line bisecting the angle formed by the vertical midplanes of the rear vehicle wheels, the "dynamic setback angle" designates the angle whose vertex is the center of each front wheel and whose sides are constituted on the one hand by the line which joins the centers of the front wheels and on the other hand by the line at right angles to the thrust axis of the vehicle.

It will be postulated throughout the following description that this angle is positive when the right-hand front wheel leads with respect to the left-hand front wheel or conversely.

Similarly, it will be considered by convention hereinafter that the right-hand front wheel alignment angle as a function of the vehicle thrust axis is positive if toe-in takes place with respect to the thrust axis. The left-hand front wheel alignment angle as a function of the vehicle thrust axis will also be considered as positive if toe-in takes place with respect to the thrust axis. In one embodiment of the method according to the invention, the aforementioned angular values are determined in an electronic computer by means of the following relations which are established geometrically:

$$2\xi = \alpha_{12} + \alpha_{21}$$

$$\delta_{13} = \frac{\alpha_{11} + \alpha_{12}}{2} + b$$

$$\delta_{23} = \frac{\alpha_{21} + \alpha_{22}}{2} - b \quad (\delta_{13} = \delta_{23})$$

-continued $$b = \frac{a_{21} - a_{11} + a_{22} - a_{12}}{4}$$

$$\delta_{10} = a_{10} + \frac{a_{21} - a_{11} + a_{22} - a_{12}}{4}$$

$$\delta_{20} = a_{20} - \frac{a_{21} - a_{11} + a_{22} - a_{12}}{4}$$

and the computer is caused to determine continuously the values of the individual alignment $\delta_{1n}$ of the right-hand front wheel and of the individual alignment $\delta_{2n}$ of the left-hand front wheel at the same instants "n" according to the relations $$\delta_{1n} = a_{1n} + \frac{a_{21} - a_{11} + a_{22} - a_{12}}{4}$$

$$\delta_{2n} = a_{2n} - \frac{a_{21} - a_{11} + a_{22} - a_{12}}{4}$$

these values being displayed in order to be read by the operator who then adjusts the alignment of the front wheels to the desired values.

It is therefore apparent that the invention permits accurate measurement of the aforementioned series of parameters or in other words the alignment angles of the front wheels, of the rear wheels as a function of the thrust axis, especially when the front wheel alignment is centered with respect to the center-point of the steering system and also when it is equally distributed with respect to the thrust axis, and the dynamic setback angle. All these measurements are made possible solely by carrying out the initial measurement of the angles between the reference straight line and the line at right angles to each associated arm and by application of the aforesaid relations which are demonstrated geometrically.

All these results can be displayed on a screen and varied individually by the operator so that the parameters involved may accordingly be adjusted to the desired values with a high degree of accuracy.

In an improved embodiment of the invention, photosensitive cells are placed above mirrors carried by the rear wheels in such a manner as to ensure that the distances between said cells and the mid-planes of the corresponding wheels are equal and that the light beams impinge on the respective cells when the front wheel system is turned from left to right or conversely from right to left, the following parameters being defined:

B = side-slip angle of the vehicle or in other words the angle whose sides are constituted on the one hand by the thrust axis and on the other hand by the axis of symmetry of the vehicle, $\beta_1$ = right-hand front wheel alignment angle as a function of the axis of symmetry, $\beta_2$ = left-hand front wheel alignment angle as a function of the axis of symmetry, $\beta_{10}$ = right-hand front wheel alignment angle with respect to the axis of symmetry when the steering system is centered, $\beta_{20}$ = left-hand front wheel alignment angle with respect to the axis of symmetry when the steering system is centered, $\beta_{13}$ = dynamic alignment angle of the right-hand front wheel with respect to the axis of symmetry, $\beta_{23}$ = dynamic alignment angle of the left-hand front wheel with respect to the axis of symmetry, $\gamma_1$ = right-hand rear wheel alignment angle as a function of the axis of symmetry, $\gamma_2$ = left-hand rear wheel alignment angle as a function of the axis of symmetry, the angular values of the aforementioned parameters are established geometrically and determined in the electronic computer. After visual display of these values by the computer, an adjustment of $\beta_1$ and $\beta_2$ to the desired values is then performed whilst the intermediate values at the instants "n", $\beta_{1n}$ and $\beta_{2n}$ remain displayed.

The apparatus of the invention comprises an arm attached laterally to each front wheel and means provided on each arm for defining a reference straight line which connects two fixed points located on the arms, an emitter for a light beam which is parallel to the plane of the corresponding front wheel and directed towards the rear wheel located on the same side, and a mirror carried by said rear wheel for reflecting the light beam onto a photosensitive cell mounted on the corresponding arm.

The means for defining the reference straight line can be constituted by angular displacement pickups placed on the front ends of the arms and forming the fixed points, said pickups being connected by a tensioning wire and constituted, for example, by potentiometers which serve to measure the alignment angles of the front wheel system.

It is also possible, however, to define said reference straight line by means of two projectors which are each placed at the front end of the arm and emit a light beam which strikes a target placed on the end of the other arm.

It is apparent that, starting from only two angular measurements and by making use of relatively inexpensive equipment, the apparatus according to the invention makes it possible to determine a complete series of angular values of practical interest for the vehicle and to carry out inspection and testing of the vehicle as a function of the tolerance ranges established for each vehicle by visually displaying the results obtained by the computer.

These and other features of the invention will be more apparent to those skilled in the art upon consideration of the following description and accompanying drawings, wherein:

FIG. 1 is a simplified view in perspective showing the front and rear wheel systems of a vehicle to which are attached the constituent elements of a first embodiment of the equipment unit according to the invention;

FIG. 2 is a geometrical diagram showing a top view of the vertical mid-planes representing the four wheels of the vehicle, the front wheel system being turned in such a manner as to ensure that the left-hand light beam impinges on the left-hand front cell after reflection from the left-hand rear mirror and that the front light beam impinges on a point located beyond the right-hand front cell after reflection from the right-hand rear mirror;

FIG. 3 is a geometrical diagram which is similar to FIG. 2 but reversed, the front wheel system being turned in such a manner as to ensure that the right-hand front light beam impinges on the right-hand front cell after reflection from the corresponding rear mirror whilst the left-hand front light beam impinges on a point located beyond the left-hand front cell;

FIG. 4 is a geometrical diagram showing the front wheel system which is positioned in such a manner as to ensure that the front wheel alignment is equally distributed with respect to the axis of thrust of the vehicle, the right-hand and left-hand light beams being therefore reflected at equal angles;

FIG. 5 is a diagram which is similar to the preceding but shows the paths of the light beams and the wheel alignment angles when the vehicle is placed at the mechanical center-point of the steering system;

FIG. 6 illustrates the second embodiment of the equipment unit and of the method according to the invention, wherein photosensitive cells are positioned at the rear above mirrors mounted on the rear wheels, the front wheel system being turned in such a manner as to ensure that the left-hand front light beam impinges on the left-hand rear cell and that the right-hand front light beam impinges on a point located beyond the right-hand rear cell;

FIG. 7 is a view which is similar to FIG. 6 but in which the right-hand front light beam impinges on the right-hand rear cell whilst the left-hand front light beam impinges on a point beyond the left-hand rear cell;

FIG. 8 is a simplified view in perspective which is similar to FIG. 1 and shows the second embodiment of the equipment unit for carrying out the method illustrated in FIGS. 6 and 7.

Referring to FIG. 1, there is shown apparatus according to the invention for measuring the alignment of the front and rear wheel systems of automotive vehicles as a function of the axis of thrust of the vehicle, as well as the dynamic "setback" angle between the wheels of the front system.

It is known that the thrust axis of a vehicle is the line bisecting the angle formed by the rear wheels of the vehicle. The dynamic setback angle is the angle whose vertex is the center of one of the front wheels and whose sides are constituted on the one hand by the straight line joining the centers of the front wheels and on the other hand by the line at right angles to the thrust axis of the vehicle, as will in any case become apparent from the drawings to which further reference will be made hereinafter.

The apparatus comprises an arm 3, 4 attached laterally to each respective front wheel 1, 2. Means are provided on each arm 3, 4 for defining a reference straight line 9 which joins two fixed points 20, 21 located on the arms 3, 4 respectively. The equipment unit further comprises an emitter 22, 5 placed on each arm 3, 4. Said emitters produce respectively a light beam $7a$, $18a$ which is parallel to the plane of the corresponding front wheel 1, 2 and directed towards the rear wheel 13, 15 which is located on the same side.

Said rear wheel is adapted to carry a mirror 8, 12 for reflecting the light beam $7a$, $18a$ constituted by a line parallel to the mid-plane of the corresponding front wheel, said beam being reflected onto a photosensitive cell 14, 24 which is mounted on the respective horizontal arm 3, 4.

The front wheels 1, 2 of the vehicle are moved onto turntables 16, 17 and the arms 3, 4 are carried by the rim of the associated wheel 1, 2 by means of an attachment device 6 which is known per se and will therefore not be described here.

In the example of construction illustrated in FIG. 1, the means for defining the reference straight line 9 are constituted by the combination of a tensioning wire 9, the ends of which are attached to the front end portions of the horizontal arms 3, 4 and by two angular displacement pickups 20, 21 which are carried respectively by the arms 3, 4. By way of example, said pickups can consist of potentiometers which are connected to each other by means of the tensioning wire 9.

Each mirror 8, 12 is placed at right angles to the plane of the corresponding rear wheel 13, 15, the reflected light beam being returned to the photosensitive cell 14, 24.

Referring now to FIGS. 2 to 5, the different angles which can be measured by means of said equipment unit will now be defined.

Let $\alpha_1$ and $\alpha_2$ be the angles delivered respectively by the right-hand front pickup 21 and the left-hand front pickup 20: $\alpha_{11}$ is the angle between the reference straight line 9 and the line 25 drawn at right angles to the arms 4 from the corresponding fixed point 21, $\alpha_{21}$ being the angle between the straight line 9 and the line 26 drawn at right angles to the arms 3 from the corresponding fixed point 20.

The angles $\alpha_{11}$ and $\alpha_{21}$ shown in FIG. 2 are measured respectively by the pickups 21 and 20 and are considered by convention as positive when the arm 4, 3 and the tensioning wire 9 form an obtuse angle as is the case in FIG. 2 (it will readily be apparent that a contrary convention could be adopted).

The second index "1" assigned to the aforementioned angles $\alpha_{11}$ and $\alpha_{21}$ is the time-interval index, FIG. 2 being considered as the situation at the instant "1". At the instant "2", the indices will therefore become "2", and so on.

Thus in FIG. 2, the front wheel system is in a first position such that the left-hand front light beam $7a$, $7b$ impinges on the left-hand front cell whilst the right-hand front light beam $18a$, $18b$ is reflected beyond the corresponding cell 24 as a result of a suitable angular displacement of the front wheel system.

In a second angular position of the front wheel system which is illustrated in FIG. 3 and reverse to the preceding, the right-hand front light beam $18a$, $18b$ is reflected from the corresponding cell 24 whilst the left-hand front light beam $7a$, $7b$ impinges on a point located beyond the cell 14 of the left-hand front wheel 1 after a suitable pivotal displacement of this latter.

In FIG. 3, the above-mentioned angles become respectively $\alpha_{12}$ and $\alpha_{22}$, the angle $\alpha_{12}$ being negative and the angle $\alpha_{22}$ being positive.

The axis of thrust of the vehicle is designated by the reference 27 whilst the straight lines 28 and 29 are parallel to the axis of thrust 27 and drawn from the points of impact of the light rays $7a$, $18a$ on the corresponding mirrors 8, 12.

$\delta_1$ is the angle of alignment of the right-hand front wheel as a function of the thrust axis 27 (the angle being positive if it corresponds to toe-in and negative if it corresponds to toe-out of the wheel). It is apparent from FIGS. 2 and 3 that this angle $\delta_1$ ($\delta_{11}$ in FIG. 2 and $\delta_{12}$ in FIG. 3) is the angle between the straight line 25 which is perpendicular to the vertical plane containing the light beam $18a$ and drawn from the fixed point 21, and the line which is perpendicular to the axis 27 and also drawn from the point 21.

$\delta_2$ is the angle of alignment of the left-hand front wheel as a function of the thrust axis 27 (said angle being positive if it corresponds to toe-in and negative if it corresponds to toe-out).

It is apparent from FIGS. 2 and 3 that said angle $\delta_2$ ($\delta_{21}$ in FIG. 2 and $\delta_{22}$ in FIG. 3) is the angle between the straight line 26 which is perpendicular to the vertical plane containing the light beam $7a$ and which is drawn from the fixed point 20, and the line which is perpendicular to the axis 27 and drawn from the point 20.

The second indices assigned to the different angles represent the successive instants corresponding to FIGS. 5, 2 and 3 which therefore show the respective angles $\alpha_{10}$ (negative), $\alpha_{20}$ (positive), $\delta_{10}$ (positive), $\delta_{20}$ (positive), $\alpha_{11}$ (positive), $\alpha_{21}$ (positive), $\delta_{11}$ (positive), $\delta_{21}$ (negative); $\alpha_{12}$ (negative), $\alpha_{22}$ (positive), $\delta_{12}$ (negative) and $\delta_{22}$ (positive).

It can also be seen in these figures that the vertex of the angle b of dynamic setback of the vehicle corresponds to the center of each front wheel 1, 2 and that the sides of said angle are constituted on the one hand by the straight line 60 (shown in FIG. 2) which joins the centers of the front wheels 1, 2 and on the other hand by the line 61, 62 which is perpendicular to the axis of thrust 27 and drawn from the center of the front wheel 2, 1.

Said angle is positive when the right-hand front wheel 2 leads with respect to the left-hand front wheel 1 as is the case in FIGS. 2 to 5.

$\xi$ is the half-angle of rear wheel alignment as a function of the thrust axis 27 or in other words the angle made in the case of each wheel 13, 15 by the line 64 perpendicular to the axis 27 and the line 63, 65 perpendicular to the mid-plane of the corresponding wheel 13, 15, these perpendicular lines being materialized by the planes of the mirrors 8, 12.

This angle is negative in the figures since the rear wheels are set in a "toe-out" position.

By reason of the small movement of rotation to be performed by the wheels in order to pass through the successive stages of FIGS. 2, 3 and 4, it may be considered that the dynamic setback angle b remains practically constant.

In operation, one measures by means of angular displacement pickups 21, 20 the angles $\alpha_1$ and $\alpha_2$ successively in the situation of FIG. 2 and in the situation of FIG. 3 in order to obtain $\alpha_{11}$ and $\alpha_{21}$ in the first position, then $\alpha_{12}$ and $\alpha_{22}$ in the second position. By means of the four angles thus measured, it is then possible to determine geometrically and to compute successively in an electronic computer forming part of the equipment unit according to the invention (but not shown in the drawings) the following values:

$\delta_{10}$, $\delta_{20}$, $\delta_{13}$, $\delta_{23}$, b and $\xi$

However, before placing the wheels in the positions illustrated in FIGS. 2 and 3, the operator centers the steering system of the vehicle with respect to the center-point of this latter as indicated by the manufacturer (position of the wheels of FIG. 5), with the result that the values $\alpha_{10}$ and $\alpha_{20}$ can be measured by the pickups 21, 20 and stored in the computer, consequently at the instant O.

As mentioned earlier, the operator then turns the vehicle wheels successively from left to right and conversely in order to establish the conditions of FIGS. 2 and 3. It is apparent from FIG. 2 that the light ray 7b impinges on the left-hand front cell 14. We therefore have the following equations:

$\delta_{21} = \alpha_{21} - b = \xi$ $\delta_{11} = \alpha_{11} + b$

From FIG. 3, it is apparent that the light ray 18b impinges on the right-hand front cell 24 and that we therefore have the equations:

$\delta_{12} = \alpha_{12} + b = \xi$ $\delta_{22} = \alpha_{22} - b$

From this it is possible to deduce the total rear wheel alignment:

$2\xi = \alpha_{12} + \alpha_{21}$

In FIG. 4, the front wheel alignment is distributed as a function of the thrust axis 27, with the result that we have the relation:

$\delta_{13} = \delta_{23} = \alpha_{13} + b = \alpha_{23} - b$

The relationship between FIGS. 2, 3 and 4 is as follows:

$$\delta_{13} = \frac{\delta_{11} + \delta_{12}}{2}$$

$$\delta_{23} = \frac{\delta_{21} + \delta_{22}}{2}$$

Thus, without passing physically through FIG. 4, the angles $\delta_{13}$, $\delta_{23}$ and b are obtained by computation as follows:

$$\delta_{13} = \frac{\alpha_{11} + \alpha_{12}}{2} + b$$

$$\delta_{23} = \frac{\alpha_{21} + \alpha_{22}}{2} - b \quad (\delta_{13} = \delta_{23})$$

$$b = \frac{\alpha_{21} - \alpha_{11} + \alpha_{22} - \alpha_{12}}{4}$$

The relation $\delta_{13} = \delta_{23}$ represents physically the individual dynamic alignment angle of each front wheel 2,1, that is, when the front wheel alignment is distributed with respect to the thrust axis 27, which corresponds to the real wheel alignment on the road when the driver releases the steering-wheel.

With reference to FIG. 5, the computer can then calculate the individual alignment values $\delta_{10}$ and $\delta_{20}$ of the front wheels as a function of the thrust axis 27 when the steering system is at its mechanical center-point:

$$\delta_{10} = \alpha_{10} + \frac{\alpha_{21} - \alpha_{11} + \alpha_{22} - \alpha_{12}}{4}$$

$$\delta_{20} = \alpha_{20} - \frac{\alpha_{21} - \alpha_{11} + \alpha_{22} - \alpha_{12}}{4}$$

Thus, in order to achieve this result when starting from the situation of FIG. 5, the operator passes successively through the situations of FIGS. 2 and 3 from which the value b is obtained, thus permitting the final computation of the values $\delta_{10}$ and $\delta_{20}$.

It is apparent that, at the end of this second stage, the equipment unit can indicate the following results:

—$\delta_{10}$, $\delta_{20}$
—$\delta_{13}$, $\delta_{23}$, b
—$2\xi$

Should the operator desire to carry out an adjustment of the front wheel alignment after a vehicle inspection and testing operation, it is apparent that the computer is capable of continuously providing the operator with the individual alignment values $\delta_{1n}$ and $\delta_{2n}$ of the front wheels since the angular displacement pickups 21 and 20 perform continuous measurement of $\alpha_{1n}$ and $\alpha_{2n}$:

$$\delta_{1n} = \alpha_{1n} + \frac{\alpha_{21} - \alpha_{11} + \alpha_{22} - \alpha_{12}}{4}$$

$$\delta_{2n} = \alpha_{2n} - \frac{\alpha_{21} - \alpha_{11} + \alpha_{22} - \alpha_{12}}{4}$$

Thus the values $\delta_{1n}$ and $\delta_{2n}$ can be adjusted as the checking operation proceeds by virtue of the visual display of these angles on a screen and the operator can accordingly adjust the wheel alignment to the desired values.

A number of alternatives may be contemplated for the use of the apparatus as described in the foregoing. By way of example, it is thus possible to display the value $(\delta_{10} - \delta_{20})$ representing the difference between the alignment angles of the front wheels 2, 1 with respect to the thrust axis 27 when the steering system is centered as well as the value $(\delta_{10} - \delta_{20})/2$ representing the angle between the line bisecting the front wheels 1, 2 and the thrust axis 27 when the steering system is centered.

This technique can also be used for providing the operator with an indication of the direction of turning of the vehicle wheels in order to obtain the configuration corresponding to dynamic wheel alignment of the vehicle or in other words the state corresponding to FIG. 4. This enables the operator to determine the position of the steering-wheel and of the center-point of the steering system when he releases the steering-wheel on a roadway. With this objective, the equipment unit provides the operator with an indication of the direction of turning of the wheels, then of the exact position which satisfies the following relations:

$$\alpha_{13} = \frac{\alpha_{11} + \alpha_{12}}{2}$$

$$\alpha_{23} = \frac{\alpha_{21} + \alpha_{22}}{2}$$

This position of the steering-wheel accordingly corresponds to the situation of FIG. 4.

Referring to FIGS. 6 to 8, there will now be described a second embodiment of the apparatus according to the invention.

The apparatus illustrated in FIG. 8 comprises a photosensitive cell 30, 31 associated with each rear wheel 13, 15 and respectively mounted above the corresponding mirror 8, 12 at a distance from the mid-plane of each wheel 13, 15 which is equal in the case of both wheels.

At the time of turning of the front wheels 1, 2 from left to right and conversely, the light rays which are parallel to the mid-planes of the front wheels 7a, 18a thus impinge alternately on the cells 30 and 31.

Thus in the situation of FIG. 6, the light ray 7a impinges on the left-hand rear cell 30 whilst the light ray 18a impinges on a point located beyond the right-hand rear cell 31, this situation being reversed in FIG. 7. Furthermore, in the case of the vehicle shown diagrammatically in these figures, the front-wheel track width 2e is larger than the rear-wheel track width 2h and the front axle 1, 2 is displaced to the right with respect to the rear axle 13, 15.

The angles and references appearing in these figures are defined as follows:

The straight line 32 is the axis of symmetry of the vehicle or in other words the line which joins the centers of the two axles.

The straight lines 33 and 34 are parallel to the axis of symmetry 32 and pass respectively through the points of impact of the light rays 7a and 18a.

$\delta_{24}$ = alignment angle of the left-hand front wheel 1 with respect to the thrust axis 27 when the light ray 7a impinges on the left-hand rear cell 30 (FIG. 6);

$\alpha_{24}$ = value of the angle $\alpha_2$ of the left-hand front wheel 1 when the light ray 7a impinges on the left-hand rear cell 30 (FIG. 6);

$\delta_{14}$ = alignment angle of the right-hand front wheel 2 with respect to the thrust axis 27 when the situation corresponds to FIG. 6;

$\alpha_{14}$ = value of the angle $\alpha_1$ of the right-hand front wheel 2 when the situation corresponds to FIG. 6;

$\delta_{15}$ = alignment angle of the right-hand front wheel 2 with respect to the thrust axis 27 when the light ray 18a impinges on the right-hand rear cell 31 (FIG. 7);

$\alpha_{15}$ = value of the angle $\alpha_1$ in the case of the right-hand front wheel 2 when the light ray 18a impinges on the right-hand rear cell 31;

$\delta_{25}$ = alignment angle of the left-hand front wheel 1 with respect to the thrust axis 27 in the situation corresponding to FIG. 7;

$\alpha_{25}$ = value of the angle $\alpha_2$ in the case of the left-hand front wheel 1 when the situation corresponds to FIG. 7;

$\beta$ = side-slip angle of the vehicle in which the sides of the angle are constituted on the one hand by the thrust axis 27 and on the other hand by the axis of symmetry 32 of the vehicle;

$\beta_1$ = angle of right-hand front wheel alignment as a function of the axis of symmetry 32;

$\beta_2$ = angle of left-hand front wheel alignment as a function of the axis of symmetry 32;

$\beta_{10}$ = angle of right-hand front wheel alignment with respect to the axis of symmetry 32 when the steering system is at its mechanical center-point;

$\beta_{20}$ = angle of left-hand front wheel alignment with respect to the axis of symmetry 32 when the steering system is at its mechanical center-point;

$\beta_{13}$ = angle of dynamic alignment of the right-hand front wheel with respect to the axis of symmetry 32;

$\beta_{23}$ = angle of dynamic alignment of the left-hand front wheel with respect to the axis of symmetry 32;

$\gamma_1$ = angle of alignment of the right-hand rear wheel as a function of the axis of symmetry 32 (FIG. 6);

$\gamma_2$ = angle of alignment of the left-hand rear wheel as a function of the axis of symmetry 32.

By virtue of simple geometrical considerations and with reference to FIGS. 6 and 7, it is apparent that the side-slip angle $\beta$ is given by the formula:

$$\beta = \frac{\delta_{15} - \delta_{24}}{2}$$

As a function of the measurements performed successively by the pickups 21 and 20, this relation becomes:

$$\beta = \frac{\alpha_{15} - \alpha_{24}}{2} + \frac{\alpha_{21} - \alpha_{11} + \alpha_{22} - \alpha_{12}}{4}$$

It is further apparent from FIGS. 6 and 7 that the angles of front and rear wheel alignment as a function of the axis of symmetry 32 have the following values:

$$\beta_{14} = \delta_{14} - \beta = \alpha_{14} - \frac{\alpha_{15} - \alpha_{24}}{2}$$

$$\beta_{24} = \delta_{24} + \beta = \alpha_{24} + \frac{\alpha_{15} - \alpha_{24}}{2}$$

$$\beta_{15} = \delta_{15} - \beta = \alpha_{15} - \frac{\alpha_{15} - \alpha_{24}}{2}$$

$$\beta_{25} = \delta_{25} + \beta = \alpha_{25} + \frac{\alpha_{15} - \alpha_{24}}{2}$$

The results thereby achieved are as follows:

$$\gamma_1 = \xi - \beta =$$

$$\frac{\alpha_{12} + \alpha_{21}}{2} - \frac{\alpha_{15} - \alpha_{24}}{2} - \frac{\alpha_{21} - \alpha_{11} + \alpha_{22} - \alpha_{12}}{4}$$

$$\gamma_2 = \xi + \beta =$$

$$\frac{\alpha_{12} + \alpha_{21}}{2} + \frac{\alpha_{15} - \alpha_{24}}{2} + \frac{\alpha_{21} - \alpha_{11} + \alpha_{22} - \alpha_{12}}{4}$$

The angles $\beta_{14}$, $\beta_{24}$, $\beta_{15}$, $\beta_{25}$ do not provide the operator with advantageous results in a physical sense. On the other hand, the application of these angles to the situations of FIGS. 4 and 5 and their general extension to the adjustment stage produce the following results:

angle of alignment of the right-hand front wheel with respect to the axis of symmetry 32 when the steering system is centered (FIG. 5):

$$\beta_{10} = \alpha_{10} - \frac{\alpha_{15} - \alpha_{24}}{2}$$

angle of alignment of the left-hand front wheel with respect to the axis of symmetry 32 when the steering system is centered:

$$\beta_{20} = \alpha_{20} + \frac{\alpha_{15} - \alpha_{24}}{2}$$

angle of dynamic alignment of the right-hand front wheel with respect to the axis of symmetry 32:

$$\beta_{13} = \frac{\alpha_{11} + \alpha_{12}}{2} - \frac{\alpha_{15} - \alpha_{24}}{2}$$

angle of dynamic alignment of the left-hand front wheel with respect to the axis of symmetry 32:

$$\beta_{23} = \frac{\alpha_{21} + \alpha_{22}}{2} + \frac{\alpha_{15} - \alpha_{24}}{2}$$

angle of alignment of the right-hand front wheel with respect to the axis of symmetry 32 in the adjustment stage:

$$\beta_{1n} = \alpha_{1n} - \frac{\alpha_{15} - \alpha_{24}}{2}$$

angle of alignment of the left-hand front wheel with respect to the axis of symmetry 32 in the adjustment stage:

$$\beta_{2n} = \alpha_{2n} + \frac{\alpha_{15} - \alpha_{24}}{2}$$

FIG. 6 indicates the following additional elements:

The straight line 35a is the line which is perpendicular to the axis of symmetry 32 and drawn from the front end of the right-hand front arm 4, that is, from the fixed point 21.

The straight line 36a is the line which is perpendicular to the axis of symmetry 32 and drawn from the front end 20 of the left-hand front arm 3.

k is the static setback angle of the vehicle or in other words the angle whose vertex is the center $O_1$, $O_2$ of each front wheel 1, 2 and whose sides are constituted on the one hand by the straight line $O_1$, $O_2$ which joins the centers $O_1$ and $O_2$ and on the other hand by the respective line 36, 35 perpendicular to the axis 32.

It should be noted that the static setback k of the vehicle is given by the formula:

$$k = b - \beta$$

$$k = -\frac{\alpha_{15} - \alpha_{24}}{2}$$

It is apparent by way of conclusion that, if the rear cells 30 and 31 are added in an improved embodiment of the equipment unit according to the invention, the device is accordingly capable of displaying the following results at the end of the second checking stage:

Angular values as a function of the axis of thrust 27:
—$\delta_{10}$, $\delta_{20}$
—$\delta_{13}$, $\delta_{23}$, b
—$2\xi$ Angular values as a function of the axis of symmetry 32:
—$\delta_{10}$, $\delta_{20}$
—$\beta_{13}$, $\beta_{23}$
—$\gamma_1$, $\gamma_2$
—$\beta$, k While the adjustment stage is in progress, the following results can also be displayed continuously:
$\delta_{1n}$, $\delta_{2n}$, $\beta_{1n}$, $\beta_{2n}$.

The invention is not limited to the sequences of operation described in the foregoing. It is possible, in fact, not only to display the values ($\delta_{10} - \delta_{20}$) and $$\left( \frac{\delta_{10} - \delta_{20}}{2} \right)$$

mentioned earlier but also to display the value ($\beta_{10} - \beta_{20}$) representing the difference between the angles of alignment of the front wheels 1, 2 with respect to the axis of symmetry 32 when the steering system is centered. It is also possible to display the value $$\left( \frac{\beta_{10} - \beta_{20}}{2} \right)$$

representing the angle between the bisector-line of the front wheels 1, 2 and the axis of symmetry 32 when the steering system is centered.

In more general terms, the invention permits determination of all the results obtained by means of the linear combination:

$$C_1 \cdot \alpha_{10} + C_2 \cdot \alpha_{20} + C_3 \cdot \alpha_{11} + C_4 \cdot \alpha_{21} + C_5 \cdot \alpha_{12} + C_6 \cdot \alpha_{22} + C_7 \cdot \alpha_{14} + C_8 \cdot \alpha_{24} + C_9 \cdot \alpha_{15} + C_{10} \cdot \alpha_{25},$$

where $C_i$ with i from 1 to 10 are real numbers, on the one hand, determination of the values $\alpha_1$, $\alpha_2$ is possible, which values are read continuously by the angular displacement pickups 21 and 20, and on the other hand, determination of the values $\alpha_{10}$, $\alpha_{20}$, $\alpha_{11}$, $\alpha_{21}$, $\alpha_{12}$, $\alpha_{22}$, $\alpha_{14}$, $\alpha_{24}$, $\alpha_{15}$, $\alpha_{25}$ is possible, which values are stored at the outset of the measuring process and at the time of reception of the pulses delivered by the pnotosensitive cells 14, 24, 30 and 31.

Among the different possible alternative modes of execution, the following deserve particular mention. The means for defining the reference straight line 9 can consist of two projectors each placed at the front end of the arm 3 and 4 and adapted to emit a light beam which impinges on a target placed on the end of the other arm. It is thus possible to make provision on each arm either for a fixed beam directed at right angles to the emitter support arm toward a linear diode array placed on the opposite arm and thus to determine the values $\alpha_1$ and $\alpha_2$ or for a movable beam which carries out a continuous scan and is associated with a fixed receiver. In fact, it proves unnecessary to provide a physical connection between the arms 3, 4 as constituted by the tensioning wire 9.

The cells 14, 24 are preferably but not necessarily positioned in the vertical plane of the respective beam 7a, 18a. Should the cells not be placed in the vertical planes, however, then a correction would have to be made.

The distances a between the cells 30 and 31 and the mid-planes of the rear wheels are not necessarily equal between the front wheel system and the rear wheel system (as shown in FIG. 6).

The apparatus of the invention therefore makes it possible by means of initial measurement of two basic angular values $\alpha_1$ and $\alpha_2$, and in the different wheel configurations described in the foregoing, to determine by means of a computer an entire series of angular parameters of the vehicle and to adjust these latter continuously by displaying the results obtained from the computer. These values are computed with a very high degree of accuracy and it should be emphasized that the system of application of this method is relatively inexpensive in comparison with certain known systems, especially those which employ laser emitters and diode arrays.

What is claimed is:

1. Apparatus for measuring the alignment of the front and rear wheel systems of automotive vehicles as a function of the axis of thrust of a vehicle as well as the dynamic setback angle between the wheels of the front system, comprising an arm attached laterally to each front wheel and means on each arm for defining a reference straight line which connects two fixed points located one on each arm, an emitter for a light beam which is parallel to the plane of the corresponding front wheel and directed toward the rear wheel located on the same side of the vehicle, and a mirror carried by said rear wheel for reflecting the light beam onto a photosensitive cell mounted on the corresponding arm, said means for defining a reference straight line comprising angular displacement pickups on the front ends of the arms and connected to each other by a tensioning wire, and for each rear wheel a photosensitive cell mounted above the mirror at a distance from the mid-plane of each wheel which is equal in the case of both rear wheels, the light beams being spaced apart a greater distance than the last-named photosensitive cells whereby the light beams impinge alternately on the last-named photosensitive cells when the front wheels are turned in either direction.

2. Apparatus according to claim 1, wherein the angular displacement pickups, connected to each other by said tensioning wire, are constituted by potentiometers adapted to measure the alignment angles of the front wheel system.

* * * * *